March 29, 1966  L. J. CHAMBON  3,243,032
APPARATUS FOR CONVEYING OBJECTS AT DIFFERENT LEVELS
Filed Sept. 11, 1964  8 Sheets-Sheet 1

Fig. 1.

March 29, 1966 L. J. CHAMBON 3,243,032
APPARATUS FOR CONVEYING OBJECTS AT DIFFERENT LEVELS
Filed Sept. 11, 1964 8 Sheets-Sheet 3

March 29, 1966   L. J. CHAMBON   3,243,032
APPARATUS FOR CONVEYING OBJECTS AT DIFFERENT LEVELS
Filed Sept. 11, 1964   8 Sheets-Sheet 5

March 29, 1966     L. J. CHAMBON     3,243,032
APPARATUS FOR CONVEYING OBJECTS AT DIFFERENT LEVELS
Filed Sept. 11, 1964             8 Sheets-Sheet 8

United States Patent Office 3,243,032
Patented Mar. 29, 1966

1

3,243,032
APPARATUS FOR CONVEYING OBJECTS AT DIFFERENT LEVELS
Louis Jean Chambon, Paris, France, assignor to Societe d'Etudes de Machines Speciales, Paris, France
Filed Sept. 11, 1964, Ser. No. 395,858
Claims priority, application France, Sept. 23, 1963, 948,326, Patent 1,387,854
4 Claims. (Cl. 198—84)

This invention relates to conveyors and has specific reference to apparatus for conveying objects at different levels, notably in heat-treatment plants, which is characterized in that is comprises a plurality of horizontal superposed conveyors, each level comprising one conveyor and each conveyor, of the endless type with an upper run and a lower run, is provided with members adapted to drive separate carrier trays in directions parallel thereto, said trays being adapted to carry the objects or articles to be conveyed, the apparatus further comprising on the one hand a device disposed at a first end of each conveyor for transferring each tray from one run of the conveyor to the other run of the same conveyor while maintaining said trays parallel to themselves, and on the other hand another device disposed between two adjacent conveyors at the other ends thereof for transferring said trays from one run of a conveyor to the adjacent run of the conveyor disposed at the next level while maintaining said trays parallel to themselves during this transfer movement.

According to a complementary feature of this invention all the conveyors of the apparatus are driven from a same end which is the end at which the separate trays are transferred from one level to the next level. The other or return end of each conveyor is preferably so mounted as to have a certain free longitudinal play to permit the expansion of the conveyor in case the objects carried by the separate trays are subjected to heat treatments.

The apparatus according to this invention is advantageous in that, due to the superposed arrangement of the conveyors at different levels, the circulation path for the objects to be treated may have a considerable length so that the arrangement requires but a particularly reduced floor space. On the other hand each conveyor can be uncoupled or separated from the other conveyors without difficulty, whereby a selective treatment may be applied to the objects at each level and therefore the successive steps of a given treatment may be carried out during a same and single passage of the objects through the apparatus of this invention.

Finally, the conveyors disposed at the various levels may have different lengths as a function for instance of the duration of the treatment steps corresponding to each level; therefore the desired treatment programme may be carried out with the maximum flexibility by superposing to this end different conveyors of adequate lengths.

In order to afford a clearer understanding of this invention and of the manner in which the same may be carried out in practice, reference will now be made to the accompanying drawings, in which a typical form of embodiment of conveyor apparatus constructed according to the teachings of this invention is illustrated diagrammatically by way of example. In the drawings.

2

Figure 1:
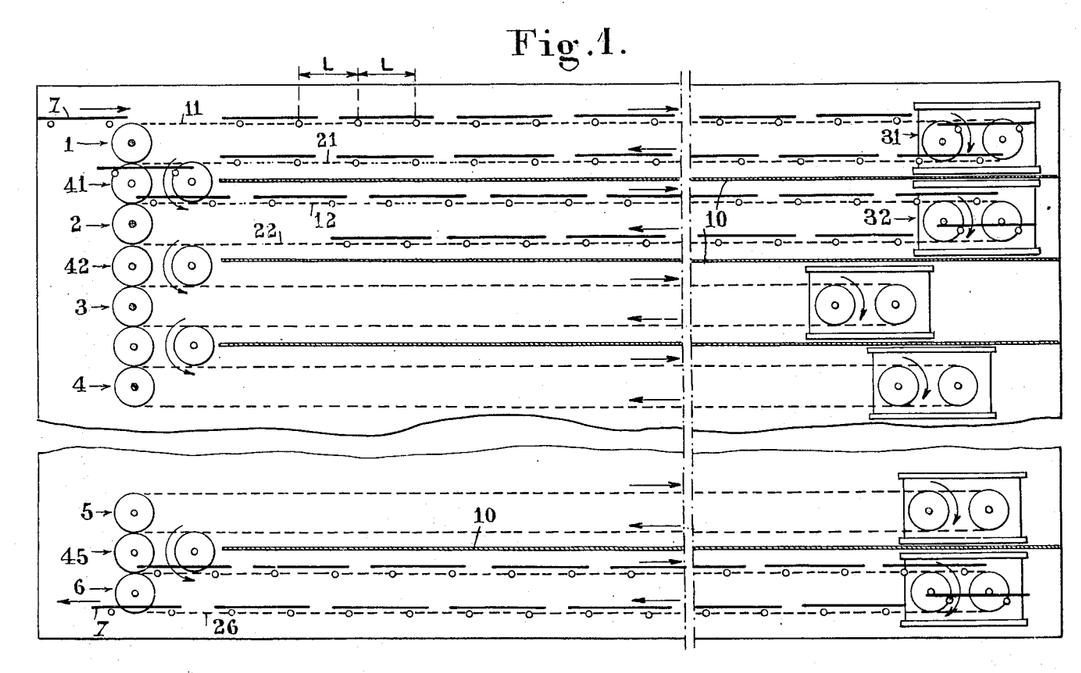
FIGURE 1 is a diagrammatic side elevational view with parts broken away showing a first form of embodiment of the conveyor apparatus of this invention.

The apparatus according to this invention comprises a plurality of horizontal superposed conveyors of the endless type which are designated by the reference numerals 1, 2, 3, 4, 5 and 6; of course, the number of conveyors in each apparatus is immaterial and depends only on the specific requirements of the treatment contemplated for the objects to be transported thereby. These objects are disposed at the inlet end of the apparatus on separate trays 7 which are introduced either into the upper portion of the apparatus as shown in FIGURE 1, or into the lower portion of the apparatus. In the first case the trays 7 follow a descending path within the apparatus and in the other case they follow an ascending path.

The separate trays 7 are introduced by any suitable and known means into the apparatus and then carried along in the right-hand direction as seen in FIGURE 1 by the upper run 11 of the first or topmost horizontal conveyor 1. The manner in which the drive is effected will be explained presently in detail. Thus the trays 7 follow one another on the upper run 11 until they attain the right-hand end of conveyor 1, a device 31 being provided at this end for transferring the separate trays 7 from the upper run 11 to the lower run 21 of the same conveyor 1. During this transfer movement the separate trays 7 are kept parallel to themselves. Then the trays 7 are carried along by the lower run 21 to the left-hand end (FIGURE 1) of conveyor 1 and taken at this end by a change-level device 41 which transfers the trays from the lower run 21 of the first conveyor 1 to the upper run 12 of the next or second conveyor 2. The separate trays 7 are then moved to the right-hand end of this second conveyor 2 by said upper run 12 and subsequently transferred onto the lower run 22 at the right-hand end of this conveyor by a device 32 similar to the aforesaid device 31; then the trays are transferred to the left-hand end of the lower run 22 of conveyor 2 until the change-level device 42 transfers them to the third conveyor 3.

The other conveyors 3, 4, 5 and 6 perform the above-described movements in the same sequence and eventually the trays 7 are expelled from the apparatus after having been carried along by the lower run 26 of the lowest conveyor 6.

In FIGURE 1 the conveyors 3 and 4 are shown only by way of illustration as having lengths differing from those of the other conveyors 1, 2, 5 and 6. This is only to prove that the lengths of the various conveyors are optional in that they may be selected as a function of the durations of the treatment steps applied to the objects or parts at the different levels of the apparatus.

If, owing to critical differences between the treatment steps such as drying, spraying, etc., to be carried at the various levels it is deemed necessary to isolate each conveyor from the next ones, partitions 10 may be disposed between adjacent conveyors. Thus, for instance alternate heating and cooling zones may be provided.

Figure 2:
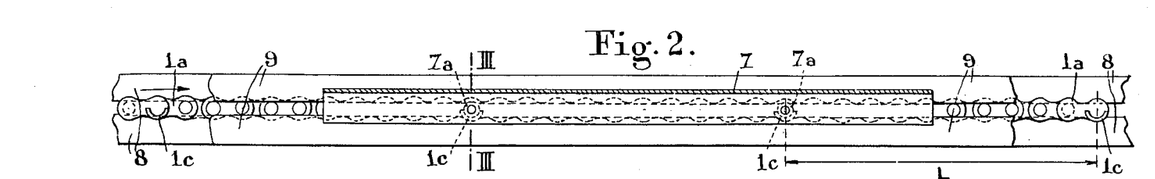
FIGURE 2 is a longitudinal section showing on a larger scale a separate tray with the driving means therefor.

Now reference will be made more particularly to FIGURES 2 and 3 of the drawings to describe a device for driving the trays 7 in connection with the uppermost conveyor 1. This conveyor comprises two parallel endless chains 1a and 1b, and plate driving members secured on the links of said chains at a relative spacing L corresponding to a multiple of the chain pitch. In the example illustrated, these driving members consist of semi-cylindrical hollow studs 1c, 1d adapted to be engaged by laterally projecting pins 7a, 7b secured on longitudinal depending side flanges of the tray 7, so that the top surface of each tray 7 is left unobstructed.

Figure 5:
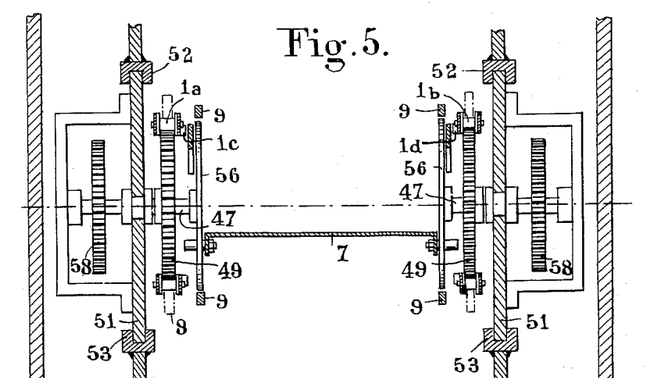
FIGURE 5 is another cross-section taken upon the line V—V of FIGURE 4.
Figure 6:
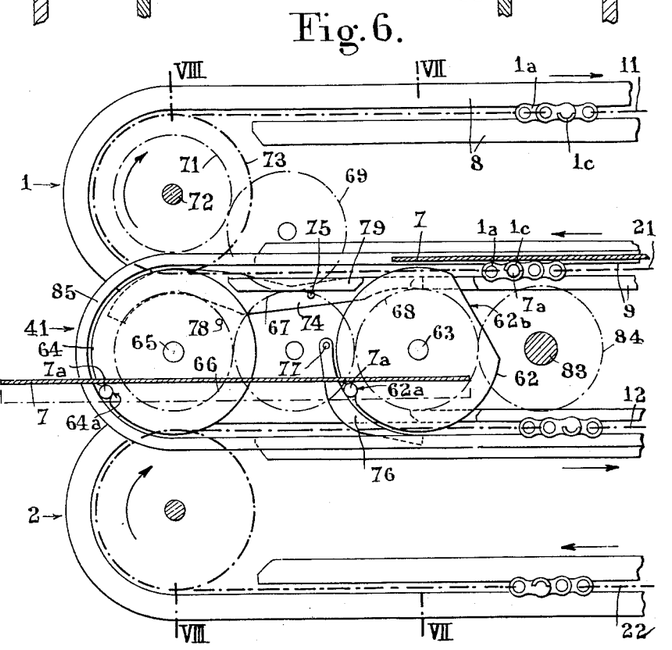
FIGURE 6 is a longitudinal section showing on a larger scale a device for transferring the separate trays from one conveyor to the conveyor located at the next level beneath, i.e., in the case of a descending conveyor apparatus.
Figure 8:
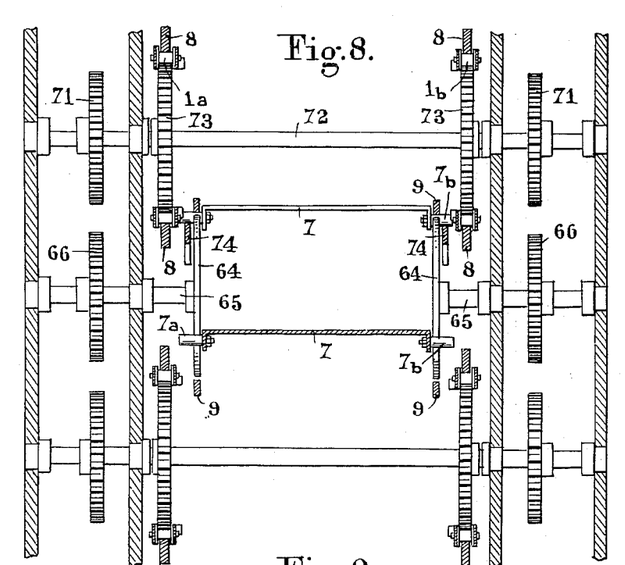
FIGURE 8 is a section taken upon the line VIII—VIII of FIGURE 6.

At either end of the conveyor the chains 1a, 1b are driven by a first pair of sprockets 49 (see FIGURES 4 and 5) and by a second pair of sprockets 73 (FIGURES 6 and 8). These chains are guided in the longitudinal direction between rails 8 and the pins 7a, 7b rigid with plates 7 are guided longitudinally between other rails 9.

As the trays 7 are introduced into the apparatus of this invention the pins 7a, 7b are caused to engage the studs 1c and 1d of chains 1a and 1b respectively, these studs underlying the pins 7a, 7b in the upper run 11 of the conveyor (FIGURES 2 and 3) so that trays 7 are carried along by the upper run 11 of the first conveyor 1 towards the right-hand end thereof as shown in FIGURE 1.

To facilitate the operation of the apparatus the interval between the last pair of pins 7a, 7b of one tray 7 and the first pair of pins of the next tray 7 is equal to the aforesaid spacing L between two successive studs 1c or 1d on chain 1a or 1b.

Figure 9:
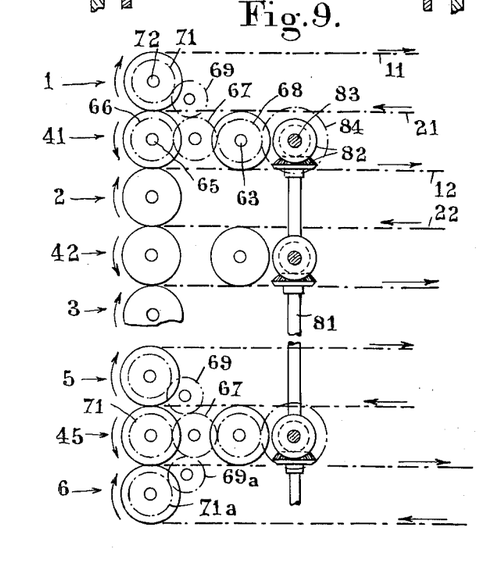
FIGURE 9 is a diagram showing the kinematic arrangement for driving the various conveyors of the apparatus.

All the conveyors 1, 2 . . . 6 are driven at their left-hand end (FIGURE 1) by a device to be described presently with reference to FIGURE 9.

As the trays 7 attain the right-hand end of the upper run 11 of conveyor 1 they are taken by the device 31 (FIGURE 4) which transfers these trays from the upper run 11 to the lower run 21 while maintaining them parallel to themselves.

Figures 3, 4:
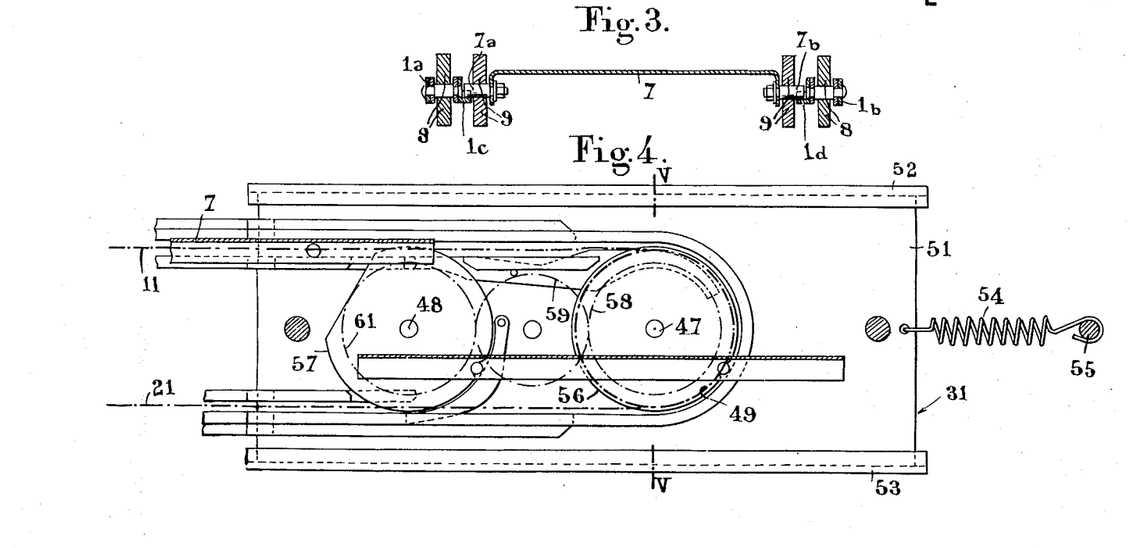
FIGURE 3 is a cross-section taken upon the line III—III of FIGURE 2.
FIGURE 4 is a longitudinal section showing on a larger scale a device for transferring the separate trays from one run of a conveyor to the other run thereof.
Figure 7:
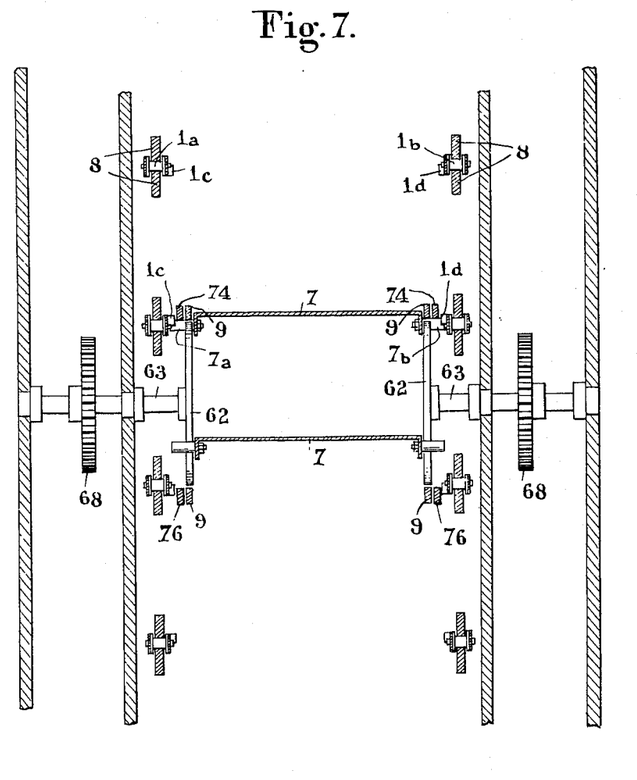
FIGURE 7 is a cross-section taken upon the line VII—VII of FIGURE 6.

The device 31 comprises essentially a frame-like structure 51 slidably mounted on upper and lower slideways 52, 53 and resiliently urged to the right (as seen in FIGURE 4) by a tension spring 54 attached at 55 to the framework of the apparatus. The mechanism for transferring the trays from one run to another in a same conveyor comprises essentially two pairs of wheels 56, 57 mounted on said frame 51 about corresponding shafts 47, 48. As this mechanism is the same as the one provided for transferring the trays from one conveyor to the adjacent conveyor the mechanism of this device 31 will not be described more in detail and the following disclosure will refer more particularly to the similar device 41 shown in details in FIGURES 6 to 8 of the drawings. However, it will be noted that in said device 31 the pair of wheels 56 for lowering the separate trays 7 are driven by the sprockets 49 rotatably solid with the shafts 47 and that these wheels 56 drive the other pair of wheels 58 through a train of gears 58, 59 and 61. Except for this difference the mechanism of device 31 is exactly the same as that of the device 41 described hereinafter.

The device 41 (FIGURES 6 to 8) comprises essentially a first pair of wheels 62 rotatably mounted on shaft 63 carried by the frame structure of the apparatus. These shafts 63 are rotatably driven from the power shaft 81 of the apparatus (FIGURE 9) driving on the one hand all the change-level devices 41, 42 . . . and on the other hand all the conveyors 1, 2 . . . 6. This power shaft 81 is adapted rotatably to drive through the medium of bevel gears 82 transverse shafts 83 driving in turn the change-level devices 41, 42 . . . , these transverse shafts being disposed externally of these devices in order not to interfere with the movements of trays 7. Each shaft 83 carries a spur gear 84 meshing with a pinion 68 solid with one of said shafts 63.

The device 41 comprises another pair of wheels 64 rotatably mounted on shafts 65 carried by the frame structure of the apparatus. Keyed on these shafts 65 are spur pinions 66 meshing with intermediate pinions 67 meshing in turn with the aforesaid pinions 68 solid with shafts 63. Thus the two pairs of wheels 62 and 64 are rotatably driven in synchronism. On the other hand, the pinions 67 are adapted to drive through pinions 69 other pinions 71 solid with the shaft 72 on which the sprocket wheels 73 of the next upper conveyor, in this case the first conveyor 1, are mounted. In the last change-level device (see FIGURE 9) the aforesaid pinion 67 is also adapted to drive through the medium of pinions 69a and 71a the sprocket wheels of the lowermost conveyor 6. The transmission ratios of the various pinions and gears are such that the peripheral velocity of the transfer wheels 62 and 64 is the same as the linear speed of chains 1a and 1b.

The transfer wheels 62 and 64 have peripheral notches 62a, 64a respectively, adapted to be engaged by the pins 7a and 7b of the separate trays 7 during the transfer of a tray from one conveyor to the next conveyor.

The device 41 also comprises two points or switches 74 fulcrumed on pins 75 and a pair of levers 76 fulcrumed on other pins 77. The functions of these points 74 and levers 76 will be explained hereinafter in conjunction with the mode of operation of the device.

The operation of this device 41 will be better understood if reference is made notably to FIGURE 6 and to the explanatory diagrams of FIGURES 10 to 15 of the drawings.

In FIGURE 6 a tray 7 is carried along in the direction of the change-level device 41 by the lower run 21 of conveyor 1. The pin 7a of tray 7 slides between the rails 9 and 11 and is carried along by a stud 1c of chain 1a which at that time overlies this pin, as shown in FIGURE 6.

The line of centers of the two shafts 63 and 65 of wheels 62 and 64 is equal to the interval L between two pairs of pins 7a and 7b of a same tray. On the other hand the wheels 62 and 64 have a pitch circle such that a one-revolution rotation of these wheels corresponds to the distance between the first pair of pins of a tray and the first pair of pins of the following tray, that is 2L.

When the pin 7a of tray 7 is in vertical alignment with the axis of shaft 63 of the first wheel 62 (see FIGURE 10) the notch 62a is exactly diametrically opposite to the pin 7a and a clearance 62b formed along one peripheral portion of wheel 62 prevents any undesired shock between this wheel 62 and the pin 7a. In this position the notch 62a of wheel 64 has the same angular position as notch 62a.

Figure 10:
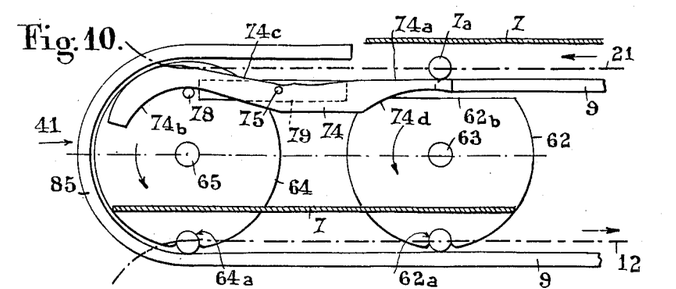
FIGURES 10 to 15 are diagrams illustrating the various positions of a tray during its transfer from one conveyor to the adjacent conveyor, in the case of a descending tray circulation.
Figure 11:
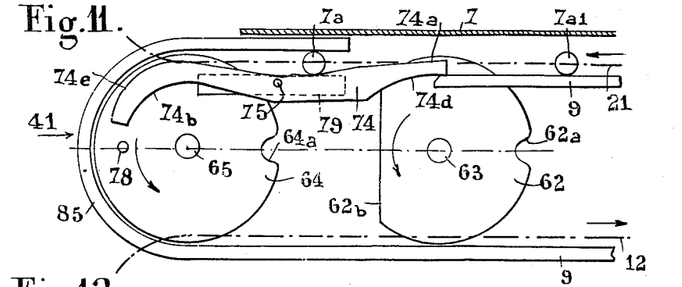

As the tray 7 continues its movement to the left from the position shown in FIGURE 10 the pin 7a firstly engages the upper edge 74a of point 74 now in horizontal position, so as to be supported by this point. This is due to the fact that the point is held in the position shown in FIGURE 10 by the pin 78 carried by wheel 64 and engaging the cam face or ramp 74b of said point 74 which is concentric with said wheel 64. This pin 78 holds the point 74 in the horizontal position until the pin 7a continuing its movement to the left is supported by a stationary horizontal rail 79 (see FIGURE 11) this supporting action continuing until the pin 7a becomes vertically co-planar with the shaft 65 of wheel 64.

Figure 12:
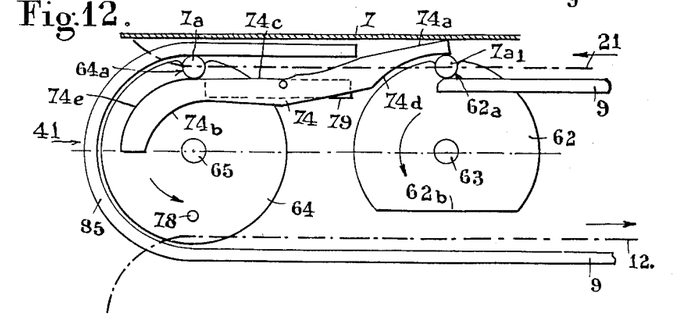
Figure 13:
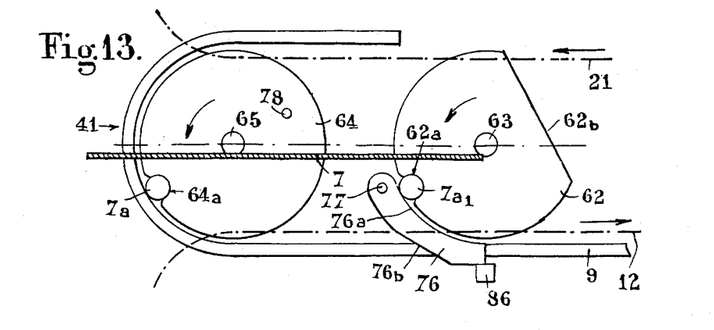

As the pin 7a moves along the stationary rail 79 it engages a cam face or ramp 74c of point 74 and since at that time the pin 78 of wheel 64 has escaped from the ramp 74b of point 74 this pin 7a will bear on ramp 74c and cause point 74 to tilt in the counter-clockwise direction to the position shown in FIGURE 12 when the pin 7a is in vertical alignment with shaft 65. At this time the pin 7a engages the notch 64a of wheel 64 and the other pin 7a₁ of the same tray 7 engages the notch 62a of wheel 62 (see FIGURE 12). As the point 74 has thus been tilted the other pin 7a₁ will position itself under the end of point 74 which is formed with cam face or ramp 74d concentric with wheel 62.

During the next portion of the movement this cam face 74d is kept in the position shown in FIGURE 12 by the pin 7a bearing against an upper cam face 74e of point 74, this pin 7a being retained in this peripheral, concentric position by a curved rail 85 accompanying the movement of pin 7a.

In FIGURE 12 it will also be seen that the functions of ramp 74d of point 74 and rail 85 respectively consist in holding the pins 7a₁ and 7a in notches 62a and 64a of wheels 62 and 64 respectively during the first portion of the descending movement of tray 7, so that this tray remains parallel to itself.

During the last portion of the angular movements of pins 7a and 7a₁ about centers 65 and 63 respectively (FIGURE 13) pin 7a is still held by the curved rail 85 and pin 7a₁ is held by a ramp 76a of lever 76 fulcrumed about pin 77. This ramp 76a is normally held concentric to wheel 62 since lever 76 bears against a stop member 86 underlying the lower longitudinal rails 9.

Figure 14:
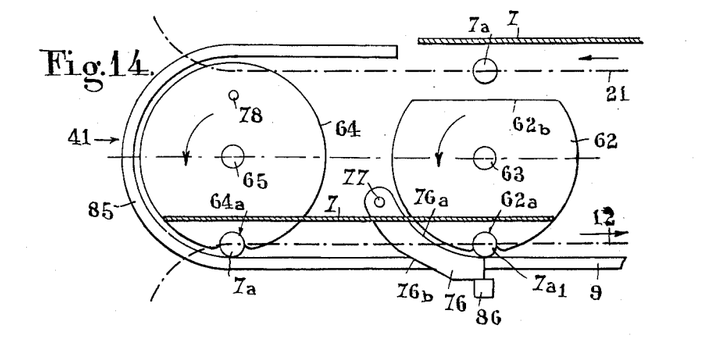
Figure 15:
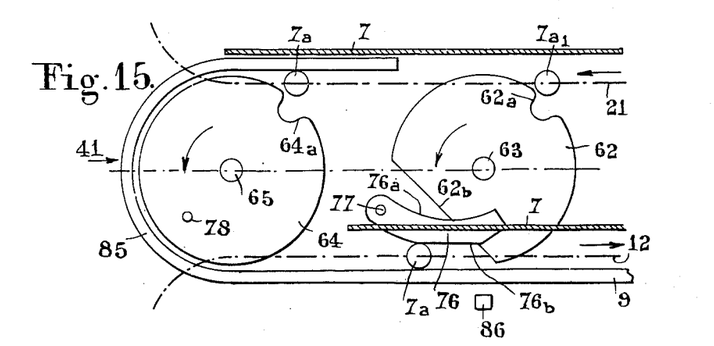
Figure 16:
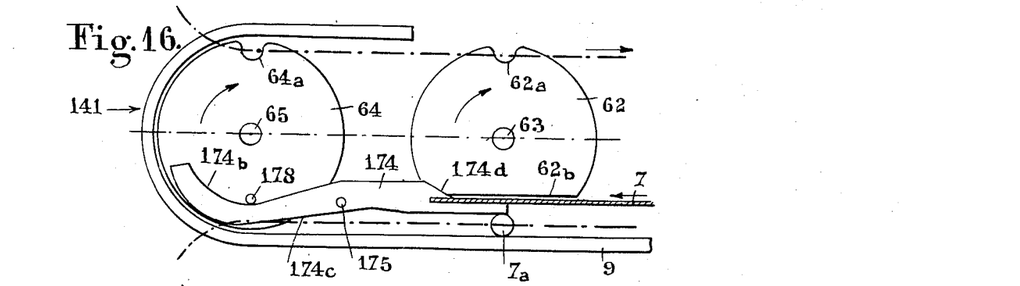
FIGURES 16 to 19 are diagrams illustrating the transfer of a tray from one conveyor to the conveyor located at the next level, in the case of an ascending tray circulation.
Figure 17:
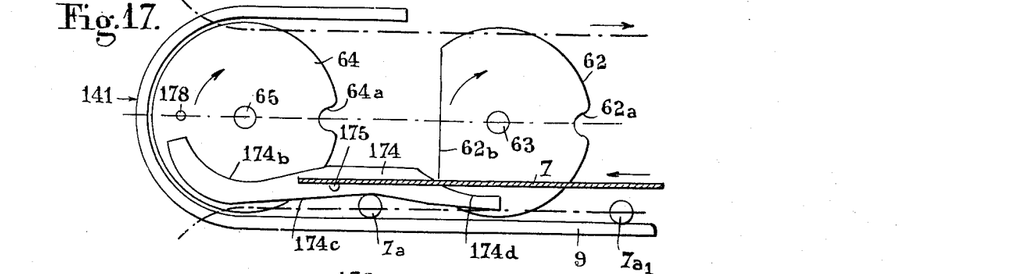

Upon completion of the rotational or angular movements of pins 7a and 7a₁ these are positioned as shown in FIGURE 14, with the notches 62a and 64a in their lowermost positions. Under these conditions tray 7 has completed its change-level movement and the leading pin 7a of the next tray 7 is in vertical alignment with the shaft of wheel 62.

The pins 7a and 7a₁ of the first tray 7 then engage the hollow studs of the upper chain run 12 of the next conveyor below. As the first tray 7 is carried along to the right from the position shown in FIGURE 14 the pin 7a (now the trailing pin of this tray) is moved beneath the lever 76 so as to engage the ramp or cam face 76b thereof and cause the lever 76 to pivot counter-clockwise in order to free the passage along the guide rails 9.

The same sequence of steps takes place with all the following trays 7 which are thus transferred from one conveyor to the next conveyor at the lower level while remaining parallel to themselves.

FIGURES 16 to 19 illustrate diagrammatically a typical or exemplary arrangement of the change-level mechanism in case the trays 7 follow an ascending path in the apparatus. In this case the point 174 fulcrumed on a pin 175 is mounted at the lower portion of the change-level device 141 and operates exactly like the point 74 described hereinabove, by firstly permitting the passage of pin 7a on the lower rail 9 due to the fact that said point is kept in the position shown in FIGURE 16 by the pin 178 carried by wheel 64. Pin 7a causes the point 174 to be tilted in the clockwise direction by bearing on ramp 174c, the pin 178 being moved away from ramp 174b concentric with wheel 64.

Figure 18:
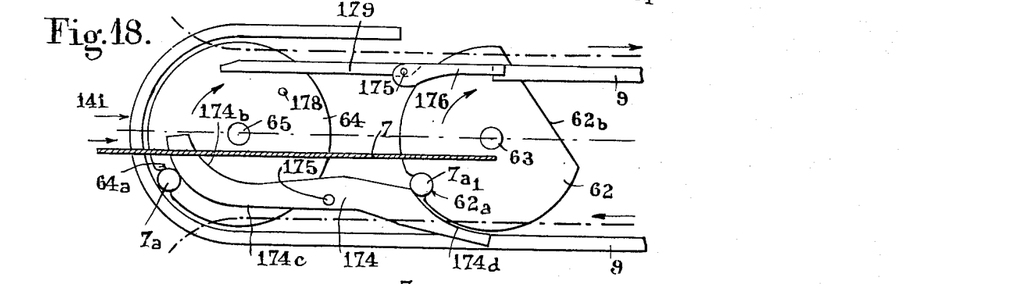

When the other pin 7a₁ becomes vertically co-planar with the shaft of wheel 62 and engages the notch 62a thereof the pin 7a rocks the point 174 to the position shown in FIGURE 18 and thus the pin 7a₁ can ride up the ramp 174d.

Figure 19:
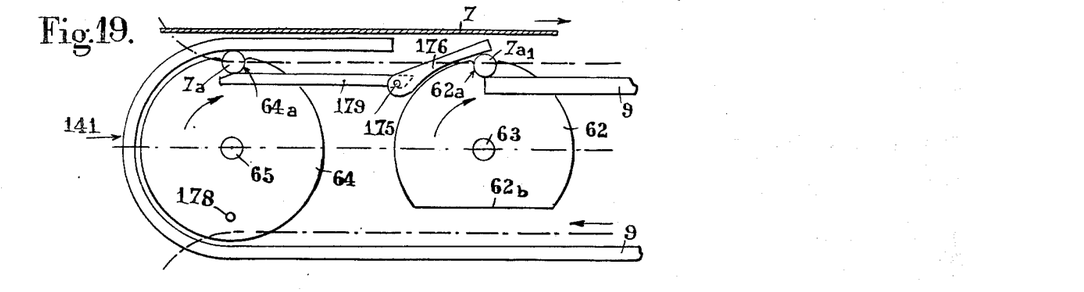

Upon completion of the upward movement of tray 7 the pin 7a thereof engages the horizontal rail 179 and the other pin 7a₁ causes the lever 176 fulcrumed at 175 to rock so that this other pin 7a₁ can engage the upper rail 9, the lever 176 subsequently falling back to its horizontal position in which it bridges the adjacent rails 179 and 9 to permit the movement of pin 7a.

Although the present invention has been described in conjunction with a preferred embodiment, it is to be understood that modifications and variations may be resorted to without departing from the spirit and scope of the invention, as those skilled in the art will readily understand. Such modifications and variations are considered to be within the purview and scope of the invention and appended claims.

What I claim is:

1. An apparatus for transporting at different levels objects carried by separate trays, notably with a view to apply a heat treatment to said objects, which comprises a frame structure, a plurality of superposed horizontal conveyors mounted on said frame structure, each level comprising one conveyor, each conveyor being of the endless type with an upper run and a lower run, and being provided with members adapted to carry along in a position constantly parallel to themselves the separate trays carrying the objects to be transported, a first transfer device arranged at a first end of each conveyor for transferring each tray from one run of the conveyor to the other run of the same conveyor while maintaining said trays parallel to themselves, and another transfer device disposed between two adjacent conveyors at the opposite ends thereof and adapted to transfer said trays from one run of said conveyor to the adjacent run of the conveyor disposed at the next level while maintaining said trays parallel to themselves during this transfer movement, slideways mounted on said frame structure and disposed on the side of said first ends of said conveyor, and frames on which the first ends on said conveyors are mounted respectively, each frame being carried by slideways of said frame structure so as to be adapted to slide thereon and thus permit the expansion of said conveyors.

2. Apparatus as set forth in claim 1, comprising a return spring attached to each frame carrying the first end of a conveyor and to the frame structure of the apparatus.

3. Apparatus as set forth in claim 1, wherein each separate tray on which the objects are carried is solid on each longitudinal side with first and second lateral pins, and each one of said first and second transfer devices comprises on each longitudinal side a first wheel and a second wheel parallel to said first wheel, the distance between the centers of said first and second wheels being equal to the distance between the centers of said first and second pins of a tray, and the circumference of said wheels corresponding to the distance measured between one pin of a tray and the same pin of the next tray on the conveyor considered, a first notch formed in the outer periphery of said first wheel, a second notch formed in the outer periphery of said second wheel, said first and second notches having the same angular positions and being adapted to receive said first and second pins respectively solid with said separate trays, means for rotatably driving in synchronism said first and second wheel in order to keep said trays parallel to themselves during their transfer movement between two conveyor runs, each transfer device comprising likewise on each longitudinal side a pivot pin disposed between said first and second wheels, a switch point pivotally mounted on said pivot pin and adapted, in its inoperative horizontal position, to guide said first pin of a tray between said first and second wheels, a pin carried by said second wheel, a first ramp formed on said switch point concentrically to said second wheel and engageable by said pin for holding said switch point in said inoperative horizontal position, a second ramp on said switch point which is interposed on the path of said first pin of said tray whereby said first pin may cause said switch point to pivot when it engages said second ramp during its movement, and a third ramp formed on said switch point, said second pin of said tray being adapted to slide along said third ramp when said switch point has been tilted by said first pin, and a clearance formed on said first wheel at a position diametrically opposite to said first notch for permitting the free passage of said first pin of said tray in the direction of said second wheel.

4. Apparatus as set forth in claim 3, wherein each transfer device comprises on each longitudinal side a rail, a curved rail adapted to keep said first pin in said second notch of said second wheel, and a pivoting lever formed with a ramp concentric to said first wheel, a stop member normally engaged by said pivoting lever, said lever being disposed in the horizontal path of said first pin after said first pin has performed its complete movement of rotation, and holding said second pin engaged in said first notch of said first wheel during the last portion of the tray transfer movement.

References Cited by the Examiner

UNITED STATES PATENTS 1,663,746  3/1928  Baker _______________ 198—159

FOREIGN PATENTS 1,105,349  4/1961  Germany.

EVON C. BLUNK, *Primary Examiner.*

RICHARD E. AEGERTER, *Examiner.*